(12) United States Patent
Dunjic et al.

(10) Patent No.: US 11,636,225 B2
(45) Date of Patent: Apr. 25, 2023

(54) METHOD AND SYSTEM FOR MANAGING ACCESS TO ENTITY IDENTITY DATA

(71) Applicant: The Toronto-Dominion Bank, Toronto (CA)

(72) Inventors: Milos Dunjic, Oakville (CA); David Samuel Tax, Toronto (CA); Kevin Wayne Faragher, Toronto (CA); Harjot Singh Panag, Brampton (CA)

(73) Assignee: The Toronto-Dominion Bank, Toronto (CA)

( * ) Notice: Subject to any disclaimer, the term of this patent is extended or adjusted under 35 U.S.C. 154(b) by 301 days.

(21) Appl. No.: 16/881,088

(22) Filed: May 22, 2020

(65) Prior Publication Data
US 2021/0365583 A1    Nov. 25, 2021

(51) Int. Cl.
*G06F 21/62* (2013.01)
*H04L 9/40* (2022.01)
*G06F 21/34* (2013.01)

(52) U.S. Cl.
CPC .......... *G06F 21/6245* (2013.01); *G06F 21/34* (2013.01); *H04L 63/102* (2013.01); *H04L 63/108* (2013.01)

(58) Field of Classification Search
CPC ... G06F 21/6245; G06F 21/34; H04L 63/102; H04L 63/108
USPC .......................................................... 726/26
See application file for complete search history.

(56) References Cited

U.S. PATENT DOCUMENTS

| 7,454,623 | B2 | 11/2008 | Hardt |
| 8,353,027 | B2 * | 1/2013 | Dennis ................... G06Q 20/40 726/18 |
| 8,990,586 | B2 | 3/2015 | Sharma et al. |
| 10,521,623 | B2 | 12/2019 | Rodriguez et al. |
| 2003/0046210 | A1 * | 3/2003 | Vora ..................... G06Q 20/385 705/36 R |
| 2008/0313039 | A1 * | 12/2008 | Altberg .............. G06Q 30/0273 705/14.54 |
| 2014/0058945 | A1 * | 2/2014 | Stecher ................ G06Q 20/383 705/44 |

(Continued)

FOREIGN PATENT DOCUMENTS

WO    2019129582    7/2019

*Primary Examiner* — Jacob Lipman
(74) *Attorney, Agent, or Firm* — Rowand LLP

(57) ABSTRACT

A system and method for managing access to entity identity data are described. The system comprises a communications module; a processor coupled with the communications module; and a memory coupled to the processor and storing processor-executable instructions which, when executed by the processor, configure the processor to authenticate a remote device as being associated with an entity; receive, via the communications module and from the remote device, pre-consent data identifying one or more third parties permitted to access entity identity data for the entity; store, in the memory, the pre-consent data in association with the entity; receive, via the communications module and from a digital identity network, a signal representing a request to release the entity identity data to the third party; determine, based on the pre-consent data, that the entity identity data is to be released to the third party; and initiate release of the entity identity data to a computing device associated with the third party.

18 Claims, 7 Drawing Sheets

(56) References Cited

U.S. PATENT DOCUMENTS

2017/0220746 A1\* 8/2017 Marshall ................. G16Z 99/00
2021/0019763 A1\* 1/2021 Helles ................ G06Q 20/4014

\* cited by examiner

600

610 Business Name:

Business Identification Number:

Consent is given to access:

620
- ☐ Bank Account Information
- ☐ Bank Balance
- ☐ Proof of Insurance
- ☐ Proof of Liquidity
- ☐ Full Access 630 Expiration Date:

METHOD AND SYSTEM FOR MANAGING ACCESS TO ENTITY IDENTITY DATA

TECHNICAL FIELD

The present application relates to databases, and, more particularly, to identity providing systems and, even more particularly, to methods and systems for managing access to entity identity data.

BACKGROUND

Entities may wish to share data with other entities in a variety of contexts. For example, an entity may wish to share a bank account number with another entity to identify an account into which an entity-to-entity transfer is to be made. In another example, an entity may wish to provide proof of liquidity or proof of insurance to another entity. For example, an entity placing a tender for work through a competitive bidding process such as a request for proposal (RFP) process may need to provide proof to the party awarding the tender that the entity has a certain level of funds available to ensure completion of the work or may need to provide proof that the entity has certain insurance in place.

Entities may share data digitally, however such sharing of data may be unsecure as data may be shared with an entity that is not authorized to view the data.

BRIEF DESCRIPTION OF THE DRAWINGS

Embodiments are described in detail below, with reference to the following drawings:

FIG. 6 is an example user interface;

Like reference numerals are used in the drawings to denote like elements and features.

DETAILED DESCRIPTION OF VARIOUS EMBODIMENTS

Figure 1:
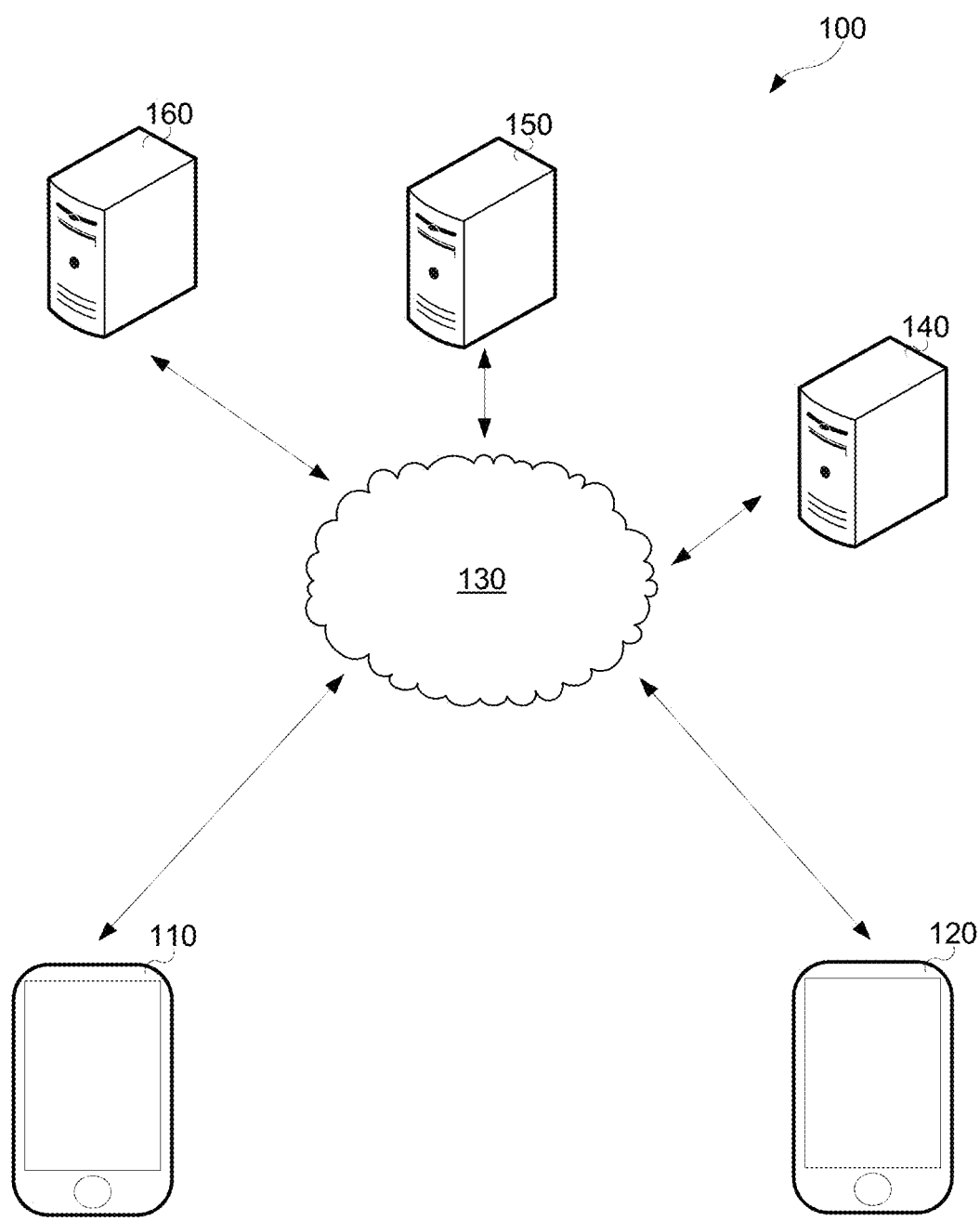
FIG. 1 is a schematic operation diagram illustrating an operating environment of an example embodiment.

In one aspect, there is a provided a system comprising a communications module; a processor coupled with the communications module; and a memory coupled to the processor and storing processor-executable instructions which, when executed by the processor, configure the processor to authenticate a remote device as being associated with an entity; receive, via the communications module and from the remote device, pre-consent data identifying one or more third parties permitted to access entity identity data for the entity; store, in the memory, the pre-consent data in association with the entity; receive, via the communications module and from a digital identity network, a signal representing a request to release the entity identity data to the third party; determine, based on the pre-consent data, that the entity identity data is to be released to the third party; and initiate release of the entity identity data to a computing device associated with the third party.

In one or more embodiments, initiating the release of the entity identity data comprises sending a signal to the digital identity network to authorize the release of the entity identity data.

In one or more embodiments, the entity identity data includes bank account information and the signal sent to the digital identity network causes the digital identity network to send a signal to a financial institution associated with the bank account information, the signal causing the financial institution to release the bank account information to the computing device associated with the third party via the digital identity network.

In one or more embodiments, the signal sent to the digital identity network causes the digital identity network to authorize the release of the entity identity data in a blind manner such that a provider of the entity identity data does not know an identity of the third party and the third party does not know an identity of the provider.

In one or more embodiments, the digital identity network includes a permissioned blockchain network.

In one or more embodiments, the pre-consent data includes an expiration date and wherein determining that the entity identity data is to be released to the third party includes determining that the expiration date has not passed.

In one or more embodiments, the processor-executable instructions, when executed by the processor, further configure the processor to determine that the pre-consent data has expired by determining that the expiration date has passed; and send, via the communications module and to the remote device, a signal requesting consent to renew the pre-consent data.

In one or more embodiments, the processor-executable instructions, when executed by the processor, further configure the processor to determine, based on the pre-consent data, that the entity identity data is not to be released to the third party; and send, via the communications module and to the authenticated remote device, a signal requesting consent to release the entity identity data to the third party.

In one or more embodiments, pre-consent data is stored for a plurality of entities having entity identity data maintained at different financial institutions.

In one or more embodiments, the entity identity data indicates whether the entity satisfies liquidity or insurance requirements.

According to another aspect there is provided a method of selectively releasing entity identity data over a digital identity network, the method comprising authenticating a remote device as being associated with an entity; receiving, via a communications module and from the remote device, pre-consent data identifying one or more third parties permitted to access entity identity data for the entity; storing, in memory, the pre-consent data in association with the entity; receiving, via the communications module and from a digital identity network, a signal representing a request to release the entity identity data to a third party; determining, based on the pre-consent data, that the entity identity data is to be released to the third party; and initiating release of the entity identity data to a computing device associated with the third party.

In one or more embodiments, initiating the release of the entity identity data comprises sending a signal to the digital identity network to authorize the release of the entity identity data.

In one or more embodiments, the entity identity data includes bank account information and the signal sent to the digital identity network causes the digital identity network to send a signal to a financial institution associated with the bank account information, the signal causing the financial institution to release the bank account information to the computing device associated with the third party via the digital identity network.

In one or more embodiments, the signal sent to the digital identity network causes the digital identity network to authorize the release of the entity identity data in a blind manner such that a provider of the entity identity data does not know an identity of the third party and the third party does not know an identity of the provider.

In one or more embodiments, the digital identity network includes a permissioned blockchain network.

In one or more embodiments, the pre-consent data includes an expiration date and wherein determining that the entity identity data is to be released to the third party includes determining that the expiration date has not passed.

In one or more embodiments, the method further comprises determining that the pre-consent data has expired by determining that the expiration date has passed; and sending, via the communications module and to the remote device, a signal requesting consent to renew the pre-consent data.

In one or more embodiments, the method further comprises determining, based on the pre-consent data, that the entity identity data is not to be released to the third party; and sending, via the communications module and to the authenticated remote device, a signal requesting consent to release the entity identity data to the third party.

In one or more embodiments, pre-consent data is stored for a plurality of entities having entity identity data maintained at different financial institutions.

According to another aspect there is provided a non-transitory computer readable storage medium comprising computer-executable instructions which, when executed, configure a processor to authenticate a remote device as being associated with an entity; receive, via a communications module and from the remote device, pre-consent data identifying one or more third parties permitted to access entity identity data for the entity; store, in memory, the pre-consent data in association with the entity; receive, via the communications module and from a digital identity network, a signal representing a request to release the entity identity data to a third party; determine, based on the pre-consent data, that the entity identity data is to be released to the third party; and initiate release of the entity identity data to a computing device associated with the third party.

Methods and systems for managing access to entity identity data within a digital identity network are described below. In an embodiment, a permissioned blockchain network may be used to provide the digital identity network. The permissioned blockchain network may only allow blocks to be written to a blockchain by nodes that are granted permission to write to the blockchain. At least some such blocks may be related to digital identity data. For example, at least some blocks may store a private secret, such as a hash of certain identity-related data. The identity-related data may be stored off-chain but the blockchain may be used to effectively provide proof of the data.

A pre-consent system manages access to entity identity data within the digital identity network. The pre-consent system stores pre-consent data that identifies one or more third parties that are permitted to access entity identity data associated with a particular entity. When a digital identity network receives a request to release entity identity data to a third party, the digital identity network sends a signal to the pre-consent system. The pre-consent system determines whether or not the third party is permitted to access the entity identity data based on the pre-consent data. When the third party is permitted to access the entity identity data, the system initiates release of the entity identity data to a computing device associated with the third party.

Some or all of the above features may be provided by some embodiments.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a block diagram illustrating an operating environment of an example embodiment. Various components cooperate to provide a digital identity system 100 which may be used, for example, to manage access to entity identity data.

An electronic device functions as a remote device 110 and an electronic device functions as a requesting device 120. The remote device 110 and the requesting device 120 are communicably coupled to at least some of the other components of the digital identity system 100. For example, the remote device 110 and the requesting device 120 may be coupled to other components through a network 130, which may include a public network such as the Internet and/or a private network.

The remote device 110 may be any electronic device that is associated with an entity represented by entity identity data available through a digital identity network 140 (this party may be referred to as the "entity"). As will be described in greater detail below, the remote device 110 may be used, by a user authorized by the entity, to generate pre-consent data identifying one or more third parties that are permitted to access entity identity data of the entity. The user may be required to input authorization information such as a secret (e.g., a password, a personal identification number, etc.), or other identifying data such as, for example, biometric data such as a fingerprint. As will be described in greater detail below, the authorization information may be used to authenticate the remote device as being associated with the entity.

The requesting device 120 may be any electronic device that issues a digital identity request. The requesting device 120 may be associated with a third party. The digital identity request is a request for validated entity identity data from the digital identity network 140. The requesting device 120 may have stored thereon an application, which may be referred to as a requesting application or a consuming application, which includes computer-executable instructions that cause the digital identity request to be issued. Additionally or alternatively, the requesting or consuming application may be an application hosted on a server, such as a web server accessible over the network 130 and the requesting device 120 may access the application over the network 130.

The remote device 110 and the requesting device 120 are computing devices. For example, the remote device 110 and the requesting device 120 may be desktop or laptop computers. However, one or both of the remote device 110 and the requesting device 120 may be a computing device of another type such as a personal computer, a tablet computer, a notebook computer, a hand-held computer, a personal digital assistant, a kiosk, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

As illustrated in FIG. 1, remote device 110 and the requesting device 120 are different devices. As mentioned, the remote device 110 is associated with an entity. The requesting device 120 may be associated with a third party that may also be an entity (this party may be referred to as a "third party"). The user or operator of the requesting device 120 is a user authorized by the third party to issue a digital identity request. The third party may require verified information about the entity. For example, the third party may require bank account information about the entity. As another example, the third party may require information indicating whether or not the entity satisfies liquidity or insurance requirements. Such information may be used to evaluate the credibility or trust-worthiness of the entity.

The digital identity system 100 may be used to provide verified information about an entity to a requesting third party. For example, in some scenarios, such verified information may be delivered to the requesting third party using the techniques described below. Verified information about an entity may be referred to as entity identity data in at least some instances herein.

The digital identity network 140 may store entity identity data. The digital identity network 140 is illustrated with a single block but it may be a network consisting of numerous computer systems. For example, the digital identity network may be a blockchain network which includes a number of nodes. The blockchain network is a decentralized peer-to-peer network in which nodes may maintain respective copies of an append-only ledger.

The blockchain network may be a permissioned blockchain network in which only authorized nodes are permitted to add blocks to the blockchain. For example, only verified nodes may be granted permission to write to the blockchain. The verified nodes may be trusted nodes such as nodes associated with government organizations or other trusted entities such as banks. By way of example, the verified nodes may be associated with a driver's license bureau, a credit bureau, a government identity issuing office such as an entity registry office, or an office of another type. Given ones of these nodes may maintain identity records of various types. For example, a node associated with a passport office may maintain digital passport records, a node associated with a driver's license bureau may maintain digital licensing records, a node associated with a credit bureau may maintain digital credit records, and a node associated with a bank may maintain digital banking records. Various verified nodes may maintain contact information records which may, for example, specify an email address, postal address, telephone number, or other type of contact information.

Accordingly, at least some verified nodes may write to the blockchain. At least some of the blocks written to the blockchain may be related to entity identity data. The digital identity network 140 may store entity identity data associated with a plurality of entities. In at least some embodiments, entity identity data representing entity information may not be included in the blockchain. Instead, the blocks may store a private secret that is related to such entity identity data. The private secret may act as proof to the existence of the entity identity data and may be used to verify the authenticity of the data. For example, in at least some embodiments, the private secret may be a hash of the entity identity data such that, when the entity identity data is provided to another system (i.e., a system apart from the verified node maintaining the entity identity data), it may be verified from the hash stored in a block on the blockchain.

Within the digital identity network 140, trusted partners may act as digital asset providers and digital asset consumers. In actions as a digital asset provider, a trusted member of the digital identity network 140 may provide information about a particular entity to another trusted member of the digital identity network 140 (e.g. a digital asset consumer). The requested information may be provided through the digital identity network 140 such that the digital asset provider does not know the identity of the digital asset consumer and such that the digital asset consumer does not know the identity of the digital asset provider.

The blockchain network may, for example, be implemented using Hyperledger Fabric, for example. It will, however, be appreciated that the blockchain network may take other forms.

The digital identity system 100 also includes an entity identity data consent management database or data store, which may be referred to as a pre-consent system 150. The pre-consent system 150 stores pre-consent data associated with one or more entities. The pre-consent system 150 is communicably coupled with the digital identity network 140 to allow the pre-consent system 150 to communicate with the digital identity network 140. In the example illustrated, the connection between the digital identity network 140 and the pre-consent system 150 is through the network 130. However, in some embodiments, the pre-consent system 150 may connect to the digital identity network 140 through a direct connection. Functions of the pre-consent system 150 will be described in greater detail below.

The digital identity system 100 may also include an authentication provider system 160. The authentication provider system 160 is configured to authenticate a user based on authorization information such as a secret (e.g., a password, a personal identification number, etc.), or other identifying data such as, for example, biometric data such as a fingerprint. The authorization information is input at the remote device 110 and a representation of the authorization information may then be provided to the authentication provider system 160. The authentication provider system 160 may access stored authorization data (such as a stored secret or stored identifying data) to validate the authorization information input by the user at the remote device 110. For example, the authentication provider system 160 may determine that the user and thus the remote device 110 are associated with an entity if the authorization information matches the stored authorization data.

The pre-consent system 150 and the authentication provider system 160 are computer systems. Computer systems may be, for example, a mainframe computer, a minicomputer, or the like. Computer systems may include one or more computer devices. For example, a computer system may include multiple computer devices such as, for example, database servers, compute servers, and the like. The multiple computer devices may be in communication using a computer network. For example, computer devices may communicate using a local-area network (LAN). In some embodiments, computer systems may include multiple computer devices organized in a tiered arrangement. For example, a computer system may include middle-tier and back-end computer devices. In some embodiments, a computer system may be a cluster formed of a plurality of interoperating computer devices.

FIG. 1 illustrates an example representation of components of the digital identity system 100. The digital identity system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
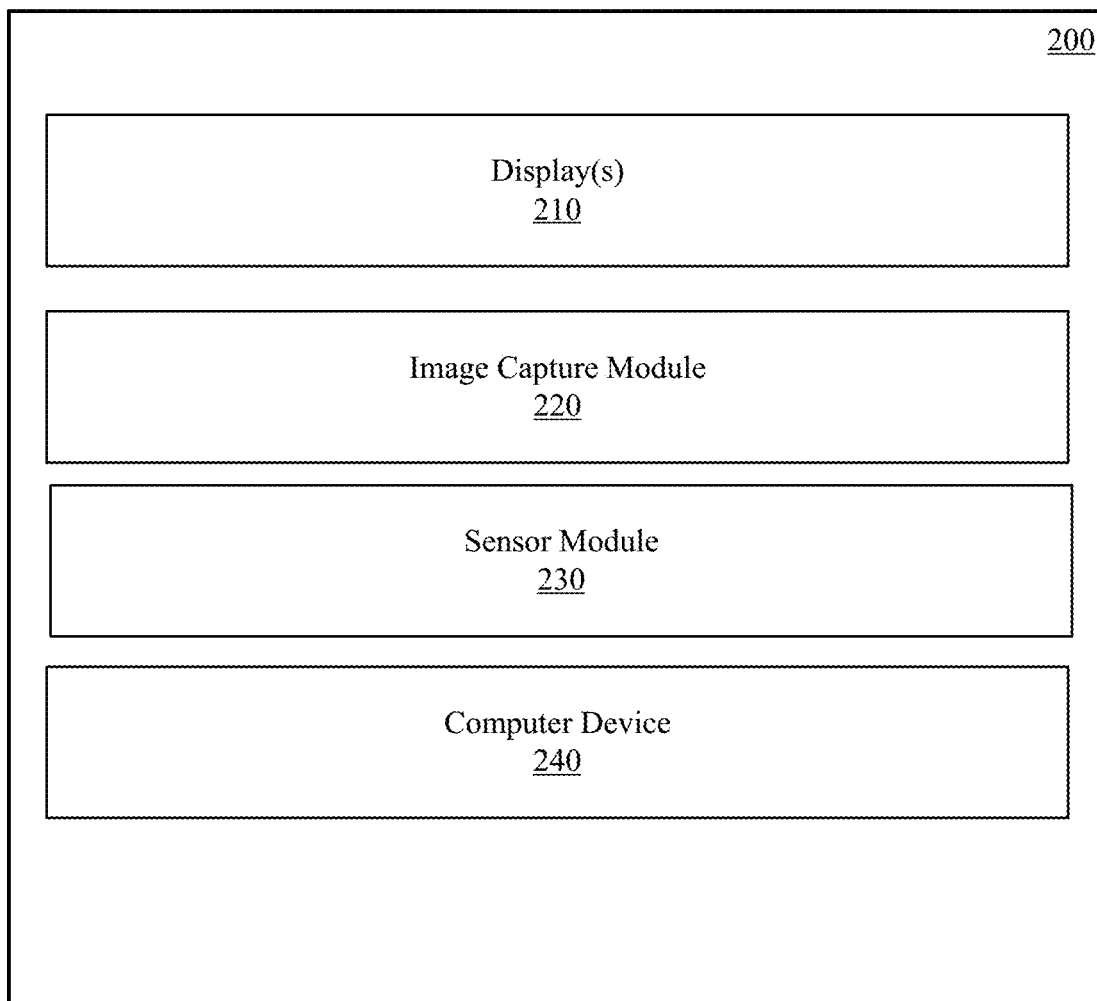
FIG. 2 is a simplified schematic diagram showing components of a computing device.

FIG. 2 is a simplified schematic diagram showing component of an exemplary computing device 200. Remote device 110 and requesting device 120 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the digital identity network 140, the pre-consent system 150 and the authentication provider system 160 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
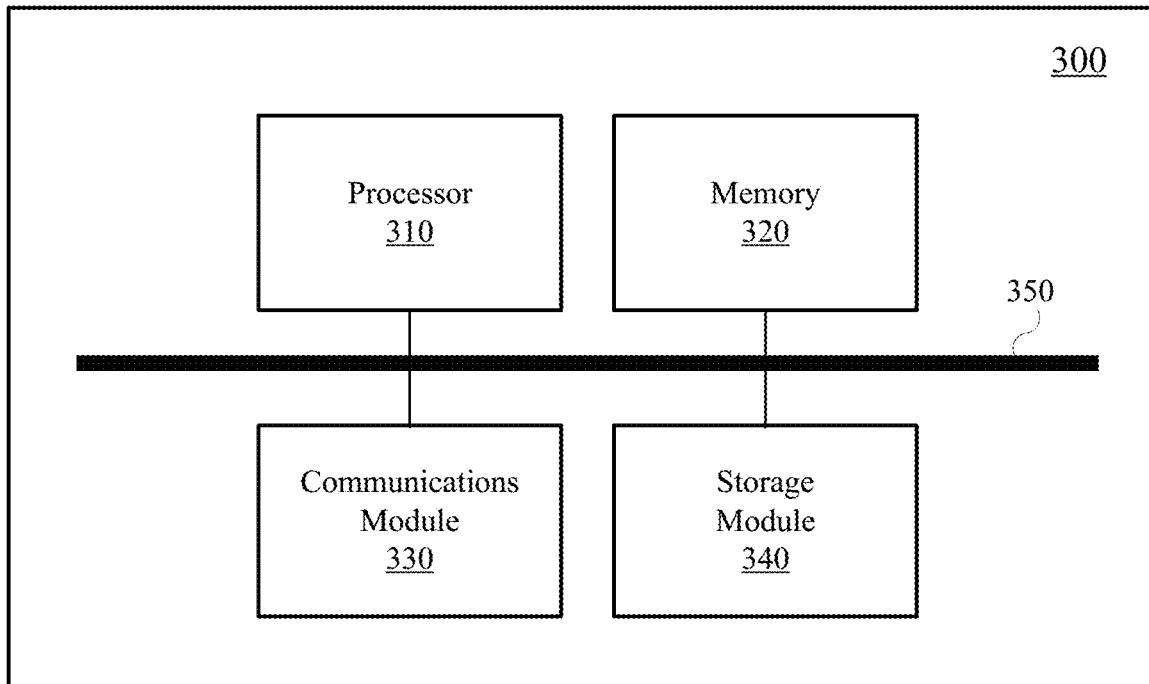
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the pre-consent system 150, the authentication provider system 160 and/or the digital identity network 140 (or a portion thereof, such as a node of the digital identity network 140).

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
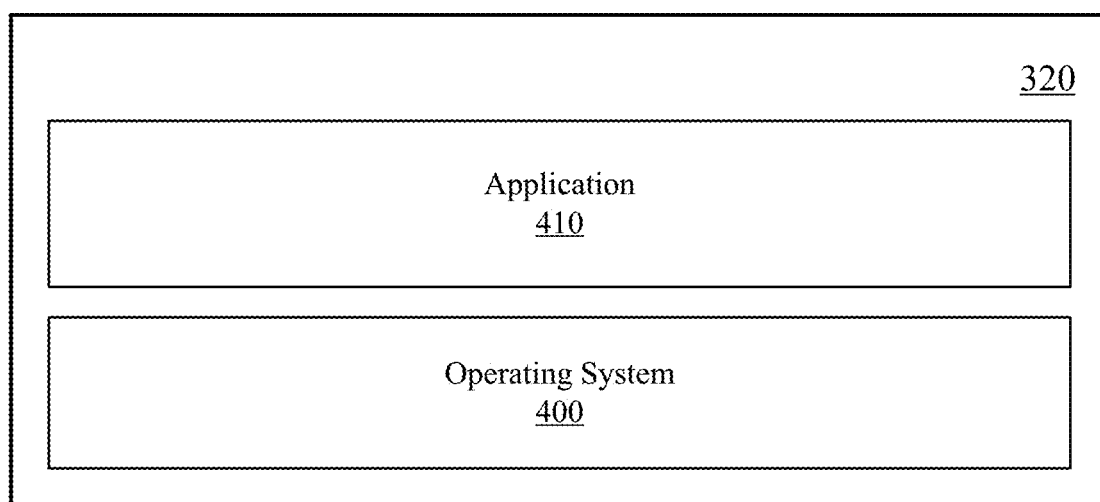
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the pre-consent system 150, the authentication provider system 160 and/or the digital identity network 140 (or a portion thereof, such as a node of the digital identity network 140).

While a single application 410 is illustrated in FIG. 3, in operation the memory 320 may include more than one application 410 and different applications 410 may perform different operations. For example, in at least some embodiments in which the computer device 300 is functioning as the remote device 110, the applications 410 may include a pre-consent application for communicating pre-consent data to the pre-consent system 150. The pre-consent data may include a list of one or more third parties permitted to access entity identity data of the entity, a scope defining an amount of entity identity data the entity is comfortable sharing with each particular third party, and an expiration date indicating a date as to when the pre-consent is no longer valid. The one or more third parties may be identified, for example, by entity name or entity number.

As another example, in at least some embodiments in which the computer device 300 is functioning as the remote device 110, the applications 410 may include an authentication application for communicating authorization information to the authentication provider system 160.

By way of further example, in at least some embodiments the pre-consent system 150, through computer-executable instructions, may be configured to receive pre-consent data from the remote device 110 and may store the pre-consent data in memory. As will be described, the pre-consent data may be used to manage access to entity identity data. Embodiments of operations performed by the pre-consent system 150 will now be described.

Figure 5:
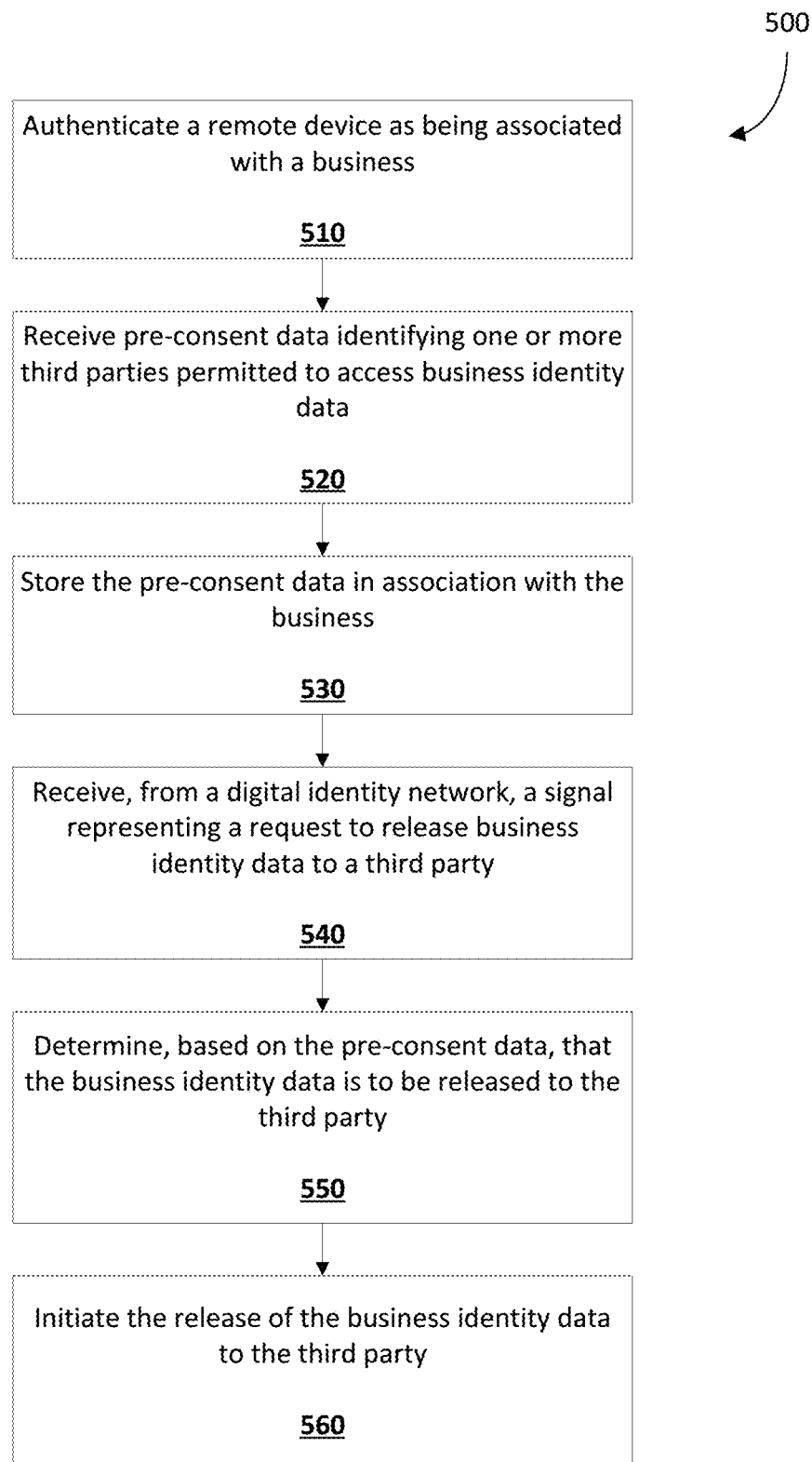
FIG. 5 is a flowchart showing operations performed by a pre-consent system in managing access to entity identity data according to an embodiment.

FIG. 5 is a flowchart showing operations performed by the pre-consent system 150 according to an embodiment. The operations may be included in a method 500 which may be performed by the pre-consent system 150. For example, computer-executable instructions stored in memory of the pre-consent system 150 may, when executed by one or more processors of the pre-consent system 150, configure the pre-consent system 150 to perform the method 500 or a portion thereof.

The method 500 beings when a remote device 110 is authenticated as being associated with an entity (step 510). In this embodiment, the remote device requests access to the pre-consent system 150 through a mobile application or webpage associated with the pre-consent system 150.

The pre-consent system 150 receives, via a communication module and from the remote device, a request to access the pre-consent system 150. In response, the pre-consent system 150 sends a link to the remote device 110 that points to an online application associated with the authentication provider system 160. For example, the link may point to a web application server configured with an online application that is configured to engage the authentication provider system 160. The link may, for example, be a uniform resource locator (URL) and the online application may be configured to authenticate the user and thus the remote device 110 as being associated with an entity using credentials entered by the user. Once the user is authenticated, it is assumed that the remote device used for the authentication is associated with the entity.

Pre-consent data is received, via the communications module, from the authenticated remote device (step 520). The pre-consent data identifies one or more third parties permitted to access entity identity data associated with the entity. The pre-consent data may include a list of one or more third parties permitted to access entity identity data of the entity, a scope indicating an amount or type of entity identity data that the entity is comfortable sharing with each particular third party, and an expiration date indicating a date as to when the pre-consent is no longer valid. The one or more third parties may be identified, for example, by entity name or entity number.

The pre-consent data may be entered by the user of the authenticated remote device 110 through a mobile application. For example, as shown in FIG. 6, the pre-consent system 150 may provide a user interface 600 to the remote device 110. The user interface 600 includes one or more interface elements 610 configured for receiving text input associated with pre-consent data and one or more interface elements 620 in the form of a check-box configured for receiving binary input associated with pre-consent data. The user interface 600 also includes an interface element 630 configured for receiving an expiration data indicating when the pre-consent expires.

In the example shown in FIG. 6, the interface elements 610 are used to identify a third party permitted to access entity identity data of the entity. The interface elements 620 are used to define a scope indicating the amount of entity identity data the third party is permitted to access. The interface element 630 is used to set the expiration date indicating when the pre-consent is no longer valid. As will be appreciated, when the interface element 630 is left blank, no expiration date is indicated and as such it may be assumed that there is no expiration date.

The pre-consent data is stored in memory in association with the entity (step 530). In this embodiment, the pre-consent data is stored by the pre-consent system 150 in memory in the form of a lookup table. By storing the pre-consent data in memory, the pre-consent system 150 is able to provide automated consent management when a request to release entity identity data is received.

A signal is received, from the digital identity network 140, representing a request to release entity identity data to a third party (step 540). In this embodiment, a digital identity request is received by the digital identity network 140 from a requesting device 120 associated with a third party. The requesting device 120 may be associated with a digital asset consumer. The digital identity network 140 generates a request to release entity identity data to the third party and communicates the request in the form of a signal to the pre-consent system 150. The signal is received, via the communications module, by the pre-consent system 150.

The request to release entity identity data includes identifying information of the third party such as for example an entity name and/or entity identification number. The request also identifies one or more scopes of entity identity data requested by the third party. For example, the one or more scopes may request bank account information, bank balance, proof of insurance, proof of liquidity, etc.

Figure 7:
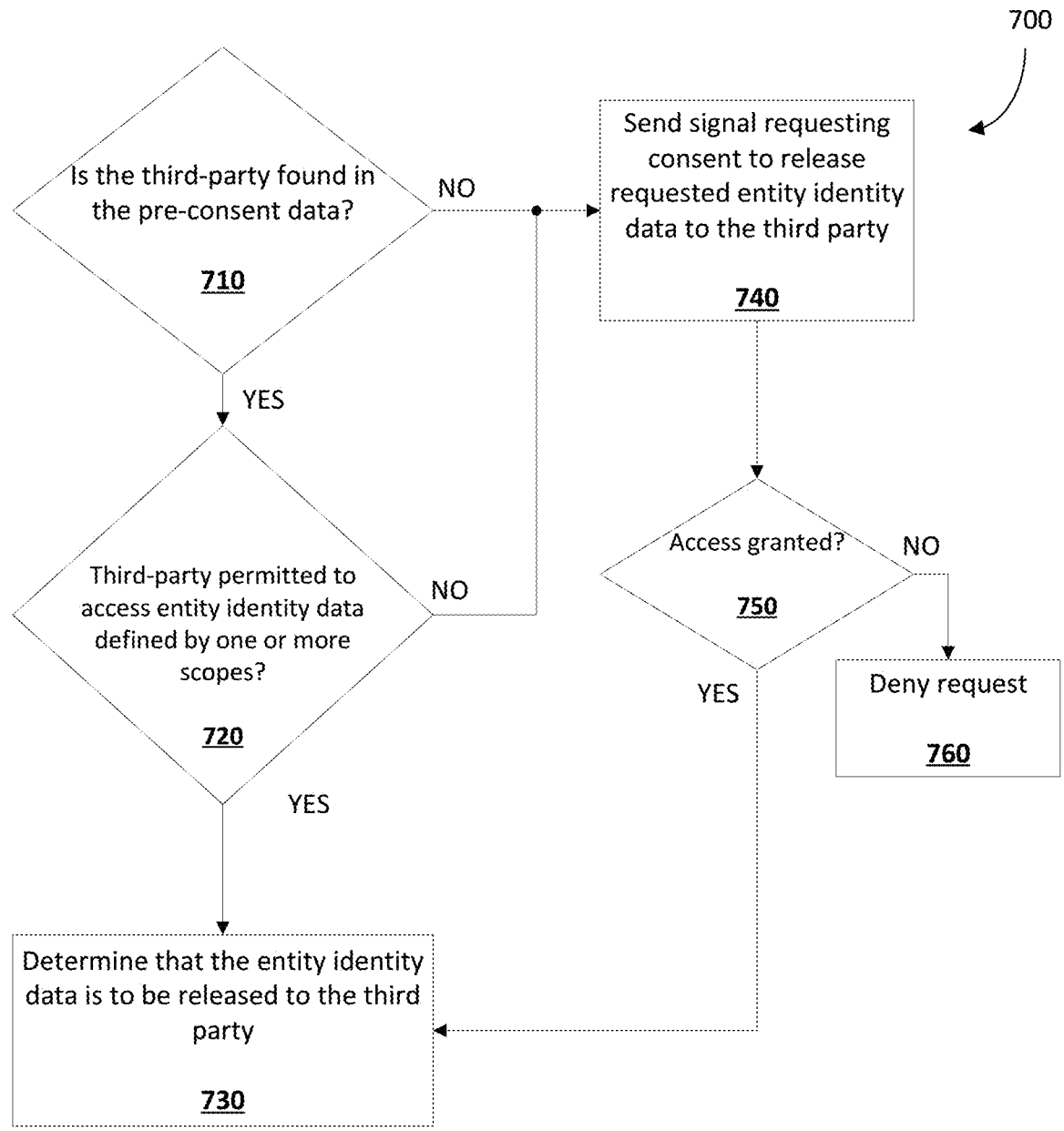
FIG. 7 is a flowchart showing operations performed by a pre-consent system in determining that entity identity data is to be released to a third-party according to an embodiment.

The pre-consent system 150 determines, based on the pre-consent data, that the entity identity data is to be released to the third party (step 550). FIG. 7 is a flowchart showing operations performed by the pre-consent system 150 to determine that the entity identity data is to be released to the third party, according to an embodiment. The operations may be included in a method 700 which may be performed by the pre-consent system 150. For example, computer-executable instructions stored in memory of the pre-consent system 150 may, when executed by one or more processors of the pre-consent system 150, configure the pre-consent system 150 to perform the method 700 or a portion thereof.

During method 700, the pre-consent system 150 analyses the identifying information of the third party and compares this information to the stored pre-consent data (step 710). When the third party is found in the pre-consent data, the pre-consent system 150 compares the one or more scopes of entity identity data to the pre-consent data to determine if the third party is permitted to access entity identity data defined by the one or more scopes (step 720). When it is determined that the third party is permitted to access entity identity data defined by the one or more scopes, it is determined that the entity identity data is to be released to the third party (step 730).

When, during step 710, the third party is not found in the pre-consent data, the pre-consent system 150 sends a signal, via the communications module and to the authenticated remote device 110, requesting consent to release the requested entity identity data to the third party (step 740). When a signal is received, via the communications module and from the authenticated remote device 110, the signal is analyzed to determine if access has been granted to the third party (step 750). When it is determined that access has been granted, the method continues to step 730 where it is determined that the entity identity data is to be released to the third party. When is determined that access has not been granted, the request is denied (step 760).

During step 720, when it is determined that the third party is not permitted to access entity identity data defined by the one or more scopes, the method continues to step 740 to request access to the requested entity identity data.

It will be appreciated that in some embodiments, when it is determined that the third-party is not found in the pre-consent data or when it is determined that the third party is not permitted to access entity identity data defined by the one or more scopes, the request may be denied without sending a signal to the authenticated remote device 110.

During method 700, the pre-consent system 150 may determine if the expiration date indicated in the pre-consent data has passed. Put another way, the date of the request to release entity identity data is compared to the expiration date to determine if the third party is still permitted to access the entity identity data. This check may be performed, for example, after step 720. During the check, when it is determined that the pre-consent data has not expired, it is determined that the entity identity data is to be released to the third party. When it is determined that the pre-consent data has expired by determining that the expiration date has passed, a signal may be sent to the authenticated remote device 110 requesting renewal of the pre-consent data in a manner similar to that of step 740.

The release of the entity identity data to the third party is initiated (step 560). In this embodiment, the pre-consent system 150 generates and sends a signal to the digital identity network 140 indicating that the entity identity data is to be released to the third party and as such the release of the entity identity data is initiated. The entity identity data may be released by a digital asset provider of the digital identity network 140 in a blind manner such that the third party does not know the identity of the digital asset provider and the digital asset provider does not know the identity of the third party.

When the signal is received by the digital identity network 140, the digital identity network 140 releases the requested entity identity data to the requesting device associated with the third party. As will be appreciated, since the entity identity data is provided by a trusted digital asset provider to the third party via the digital identity network 140, the entity identity data is trust-worthy. For example, when the requested entity identity data is proof of liquidity, the digital identity network 140 may receive data from a financial institution hosting a bank account of the entity. The digital identity network 140 may provide a binary response in the form of YES or NO indicating to the third party that the entity has available assets for an entity transaction. Since the response is from the financial institution (or trusted digital asset provider) of the entity, rather than from the entity itself, the response is trust-worthy.

Examples of using method 500 to manage access to entity identity data will now be described. In one example, an entity A may wish to send money to an entity B using a real-time payment rail. Payments made via real-time payment rails may be irrevocable since the accounts are immediately settled. As such, it is very important that account information be correct. The entity A may use the digital identity network 140 to determine the account number for entity B.

Using method 500, once a remote device is authenticated as being associated with entity B (step 510), pre-consent data is received, via the communications module and from the remote device, by the pre-consent system 150 (step 520). The pre-consent data identifies entity A as being permitted to access entity identity data associated with entity B. The pre-consent data may include a scope indicating that entity A is permitted to access the account number of entity B. The pre-consent data is stored in memory (step 530).

Entity A may send a request, using a computing device, to the digital identity network 140 to obtain the account number of entity B. The digital identity network 140 receives the request and generates a signal representing the request. The signal is received, via the communications module and from the digital identity network 140, the signal representing a request to release the account number of entity B to entity A (step 540). The pre-consent system 150 determines, based on the pre-consent data stored in memory, that entity B has permitted entity A to receive their account number (step 550). As such, the pre-consent system 150 generates and sends a signal to the digital identity network 140 indicating that the entity identity data is to be released to entity A (step 560), and as such the release of the entity identity data is initiated. When the signal is received by the digital identity network 140, the digital identity network 140 sends a signal to a digital asset provider, which in this example is a financial institution associated with the account number of entity B. The signal causes the financial institution to release the account number to the computing device associated with entity A via the digital identity network 140. Entity A is then able to make payment to entity B.

As another example, the pre-consent system 150 may be used to provide proof of insurance and/or proof of liquidity in a competitive bidding process. For example, when entity A is bidding on a request for proposal (RFP) issued by entity B, they may be required to provide proof of insurance or proof that they have available sufficient liquidity to complete the project. In this example, the digital identity network 140 may be used to facilitate the exchange of such information. For example, entity A may configure the pre-consent system 150 to authorize the release of entity identity data to entity B (using method 500 above). Entity B may issue a request to the digital identity network 140 for proof of insurance/liquidity for entity A. The digital identity network 140 then generates and sends a signal to the pre-consent system 150 requesting release of the entity identity data. The pre-consent system 150 determines that entity A has consented to allowing entity B to access entity identity data, it is released by a digital asset provider to entity B via the digital identity network 140.

As will be appreciated, in another embodiment, the pre-consent data may only identify one or more third parties permitted to access the entity identity data. Put another way, the pre-consent data may not define one or more scopes of entity identity data and may not include an expiration date. In this embodiment, the request to release entity identity data may only include identifying information of the third party requesting the entity identity data.

As will be appreciated, the pre-consent system 150 may be maintained or operated by an entity other than the digital asset provider that is providing the requesting entity identity data through the digital identity network. As such, the pre-consent system 150 may maintain or store pre-consent data for a number of entities even if, for example, the entity operating the pre-consent system 150 does not have entity identity data for any of the entities.

Figure 8:
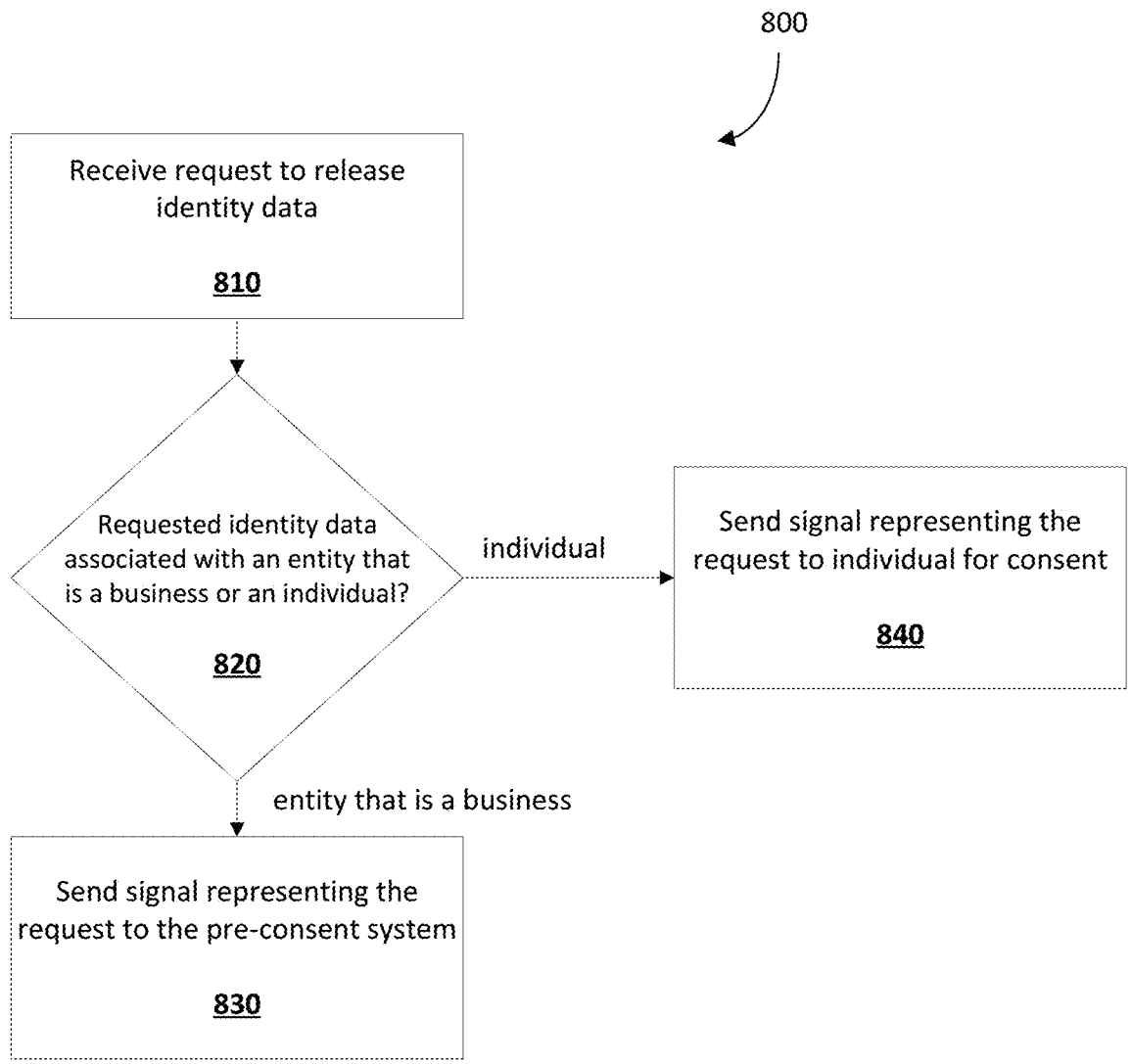
FIG. 8 is a flowchart showing operations performed by a digital identity network in determining that a digital identity request is a request for entity identity data.

In one or more embodiments, only entities that are businesses such as for example corporations, partnerships, sole proprietorships, etc. may store pre-consent data in the pre-consent system 150. Put another way, individuals may not store pre-consent data in the pre-consent system 150. When a digital identity request is received by the digital identity network 140, the digital identity network 140 may analyze the request to determine if it is a request for digital identity data associated with an entity that is a business or a request for digital identity data associate with an individual. FIG. 8 is a flowchart showing operations performed by a server of the digital identity network 140 according to an embodiment. The server may be for example an administration server. The administration server may not be a digital asset consumer or a digital asset provider. The operations may be included in a method 800 which may be performed by the server of the digital identity network 140. For example, computer-executable instructions stored in memory of the server of the digital identity network 140 may, when executed by one or more processors of the server of the digital identity network 140, configure the server of the digital identity network to perform the method 800 or a portion thereof.

The method 800 beings when a request to release digital identity data is received (step 810). The digital identity request may be received by the server of the digital identity network 140 from a requesting device 120 associated with a third party. The requesting device 120 may be associated with a digital asset consumer. The request may be a request for digital identity data associated with an entity that is a business or a request for digital identity data associated with an individual.

A check is performed to determine if the requested identity data is associated with an entity that is a business or an individual (step 820). In this embodiment, the request includes identifying data identifying the individual or entity of which the digital identity data is associated with. The server of the digital identity network 140 may determine that the requested identity data is associated with an entity that is a business based on the identifying data. For example, when the identifying data identifies "Business A" as being associated with the digital identity data, it is determined that this is an entity that is a business. When the identifying data identifies "Bob Smith" as being associated with the digital identity data, it is determined that this is an individual.

When it is determined that the requested identity data is associated with an entity that is a business, a signal representing the request is sent to the pre-consent system 150 to determine whether or not the third party is authorized to obtain entity identity data associated with the entity (step 830). The determination may be made, for example, using the methods described above.

When it is determined that the requested identity data is associated with an individual, a signal representing the request may be sent to a device associated with the individual requesting consent to release digital identity data to the third party (step 840). When consent is given, the digital identity data is released to the third party.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted certain adaptations and modifications of the described embodiments can be made. Therefore, the above discussed embodiments are considered to be illustrative and not restrictive.

What is claimed is:

1. A system comprising:
   a communications module;
   a processor coupled with the communications module; and
   a memory coupled to the processor and storing processor-executable instructions which, when executed by the processor, configure the processor to:

authenticate a remote device as being associated with an entity having entity identity data stored by a digital identity network;

receive, via the communications module and from the remote device, pre-consent data identifying one or more third parties permitted to access the entity identity data for the entity;

store, in the memory, the pre-consent data in association with the entity;

receive, via the communications module and from the digital identity network, a signal representing a request to release the entity identity data to the third party;

determine, based on the pre-consent data, that the entity identity data is to be released to the third party; and initiate release of the entity identity data to a computing device associated with the third party in a blind manner such that a provider of the entity identity data provides the entity identity data to the digital identity network and does not know an identity of the third party receiving the entity identity data and the third party receives the entity identity data from the digital identity network and does not know an identity of the provider of the entity identity data.

2. The system of claim 1, wherein the digital identity network includes a permissioned blockchain network.

3. The system of claim 1, wherein the processor-executable instructions, when executed by the processor, further configure the processor to:
determine, based on the pre-consent data, that the entity identity data is not to be released to the third party; and
send, via the communications module and to the authenticated remote device, a signal requesting consent to release the entity identity data to the third party.

4. The system of claim 1, wherein pre-consent data is stored for a plurality of entities having entity identity data maintained at different financial institutions.

5. The system of claim 1, wherein the entity identity data indicates whether the entity satisfies liquidity or insurance requirements.

6. The system of claim 1, wherein initiating the release of the entity identity data comprises sending a signal to the digital identity network to authorize the release of the entity identity data.

7. The system of claim 6, wherein the entity identity data includes bank account information and the signal sent to the digital identity network causes the digital identity network to send a signal to a financial institution associated with the bank account information, the signal causing the financial institution to release the bank account information to the computing device associated with the third party via the digital identity network.

8. The system of claim 1, wherein the pre-consent data includes an expiration date and wherein determining that the entity identity data is to be released to the third party includes determining that the expiration date has not passed.

9. The system of claim 8, wherein the processor-executable instructions, when executed by the processor, further configure the processor to:
determine that the pre-consent data has expired by determining that the expiration date has passed; and
send, via the communications module and to the remote device, a signal requesting consent to renew the pre-consent data.

10. A method of selectively releasing entity identity data over a digital identity network, the method comprising:

authenticating a remote device as being associated with an entity having entity identity data stored by a digital identity network;

receiving, via a communications module and from the remote device, pre-consent data identifying one or more third parties permitted to access the entity identity data for the entity;

storing, in memory, the pre-consent data in association with the entity;

receiving, via the communications module and from the digital identity network, a signal representing a request to release the entity identity data to a third party;

determining, based on the pre-consent data, that the entity identity data is to be released to the third party; and initiating release of the entity identity data to a computing device associated with the third party in a blind manner such that a provider of the entity identity data provides the entity identity data to the digital identity network and does not know an identity of the third party receiving the entity identity data and the third party receives the entity identity data from the digital identity network and does not know an identity of the provider of the entity identity data.

11. The method of claim 10, wherein the digital identity network includes a permissioned blockchain network.

12. The method of claim 10, further comprising:
determining, based on the pre-consent data, that the entity identity data is not to be released to the third party; and
sending, via the communications module and to the authenticated remote device, a signal requesting consent to release the entity identity data to the third party.

13. The method of claim 10, wherein pre-consent data is stored for a plurality of entities having entity identity data maintained at different financial institutions.

14. The method of claim 10, wherein initiating the release of the entity identity data comprises sending a signal to the digital identity network to authorize the release of the entity identity data.

15. The method of claim 14, wherein the entity identity data includes bank account information and the signal sent to the digital identity network causes the digital identity network to send a signal to a financial institution associated with the bank account information, the signal causing the financial institution to release the bank account information to the computing device associated with the third party via the digital identity network.

16. The method of claim 10, wherein the pre-consent data includes an expiration date and wherein determining that the entity identity data is to be released to the third party includes determining that the expiration date has not passed.

17. The method of claim 16, further comprising:
determining that the pre-consent data has expired by determining that the expiration date has passed; and
sending, via the communications module and to the remote device, a signal requesting consent to renew the pre-consent data.

18. A non-transitory computer readable storage medium comprising computer-executable instructions which, when executed, configure a processor to:
authenticate a remote device as being associated with an entity having entity identity data stored by a digital identity network;
receive, via a communications module and from the remote device, pre-consent data identifying one or more third parties permitted to access the entity identity data for the entity;

store, in memory, the pre-consent data in association with the entity;

receive, via the communications module and from the digital identity network, a signal representing a request to release the entity identity data to a third party;

determine, based on the pre-consent data, that the entity identity data is to be released to the third party; and initiate release of the entity identity data to a computing device associated with the third party in a blind manner such that a provider of the entity identity data provides the entity identity data to the digital identity network and does not know an identity of the third party receiving the entity identity data and the third party receives the entity identity data from the digital identity network and does not know an identity of the provider of the entity identity data.

* * * * *